A. ROSENTHAL.
ENSILAGE CUTTER AND ELEVATOR.
APPLICATION FILED NOV. 24, 1913.

1,289,004.

Patented Dec. 24, 1918.
2 SHEETS—SHEET 1.

WITNESSES
INVENTOR
August Rosenthal,
By Morsell & Caldwell
ATTORNEYS.

A. ROSENTHAL.
ENSILAGE CUTTER AND ELEVATOR.
APPLICATION FILED NOV. 24, 1913.
1,289,004.
Patented Dec. 24, 1918.
2 SHEETS—SHEET 2.
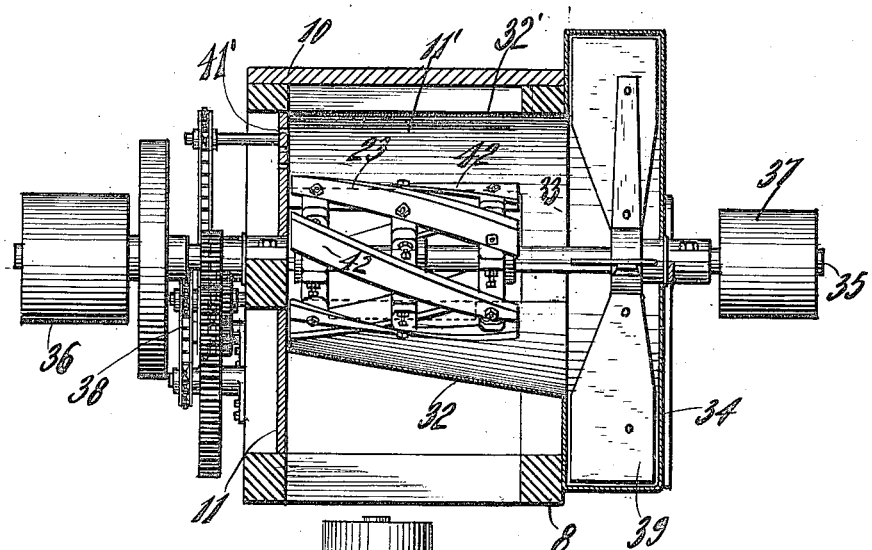
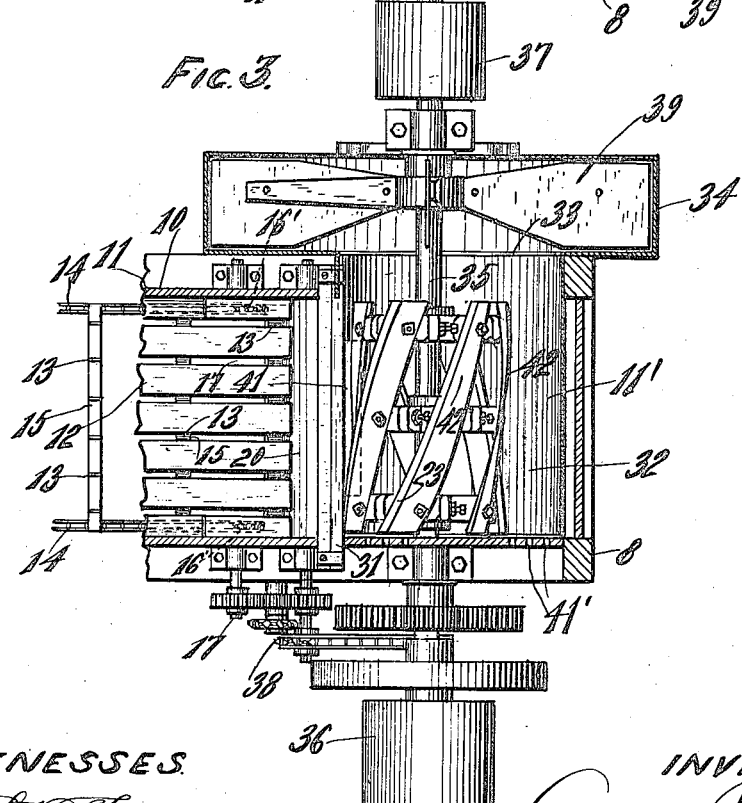
WITNESSES.
INVENTOR.
August Rosenthal.
By Morsell & Caldwell
ATTORNEYS.

UNITED STATES PATENT OFFICE.

AUGUST ROSENTHAL, OF WEST ALLIS, WISCONSIN.

ENSILAGE CUTTER AND ELEVATOR.

1,289,004.  Specification of Letters Patent.  Patented Dec. 24, 1918.

Application filed November 24, 1913. Serial No. 802,635.

*To all whom it may concern:*

Be it known that I, AUGUST ROSENTHAL, a citizen of the United States, and resident of West Allis, in the county of Milwaukee and State of Wisconsin, have invented new and useful Improvements in Ensilage Cutters and Elevators, of which the following is a description, reference being had to the accompanying drawings, which are a part of this specification.

This invention relates to improvements in ensilage cutters and elevators.

In machines for cutting and elevating ensilage as ordinarily constructed, rotary cutters and fans are used for cutting and elevating the material, and mechanical means of one kind or another are provided for conveying the cut material from the cutter to the fan casing where the material is elevated by the air blast from the fan. In machines of this type the cutter in severing short pieces or portions from the main body of material imparts a high velocity to the severed pieces and the movement of these pieces is arrested by engaging the interposed conveying means which, if inert, permits the material to fall by gravity into the fan casing, or if of the movable type, will move the material at an angle to the movement imparted to it by the cutter and at a greatly reduced speed so that this imparted movement which might be utilized to advantage is lost. Furthermore in the interposed feeding means of either type the material has a tendency to mass or accumulate in piles thus forming substantially an intermittent irregular feed to the fan casing which will at times overtax the capacity of the fan and at other times will not feed sufficient material to utilize the full power of the fan in an efficient manner. This manner of feeding material requires considerable more power than would be required to run a machine in which the material is fed to the fan in a regular continuous stream and in which advantage is taken of imparted velocity and the material is kept moving in a continuous smooth uninterrupted course toward the fan casing and also in a direction coincident with the movement of the fan and toward the discharge outlet of the fan casing without in any manner being materially deflected at an angle from a true easy path of movement nor be permitted to come to rest and drop to the bottom of the casing.

It is one of the objects of the present invention to overcome the objectionable features before mentioned and provide an improved ensilage cutter and elevator in which the features of advantage mentioned are utilized to the greatest extent, and which is adapted to cut all substances ordinarily used in forming ensilage and elevate and discharge the cut material directly into a silo and thus eliminate rehandling and unnecessary expense in the production of the ensilage.

A further object of the invention is to provide an ensilage cutter and elevator in which the elevating means is mounted directly on or adjacent to the same shaft as the cutter and the material cut thereby is discharged directly into the elevating casing without the use of intermediate mechanism and in a continuous smooth uninterrupted course without deflecting, impeding or retarding the acquired movement of the cut material.

A further object of the invention is to provide an ensilage cutter and elevator in which the elevator fan is adapted to continue and accelerate the movement imparted to the material by the cutting means of the machine instead of the fan initiating the movement of the material into and through the fan casing.

A further object of the invention is to provide an ensilage cutter and elevator in which the cutter and elevator casings are placed adjacent to each other and the cutter casing is positioned to form substantially a continuation of the air inlet conduit or wind trunk of the fan casing to facilitate the movement of the cut material into the fan casing.

A further object of the invention is to provide an ensilage cutter and elevator having improved means for feeding material to the cutter.

A further object of the invention is to provide an ensilage cutter and elevator in which the cutter is constructed to direct the cut material into the casing of the elevating means.

A further object of the invention is to provide an ensilage cutter and elevator of simple construction which is strong and durable and is well adapted for the purpose described.

With the above and other objects in view, the invention consists of the improved ensilage cutter and elevator and its parts and combinations as set forth in the claims, and all equivalents thereof.

In the accompanying drawings in which the same reference characters indicate the same parts in all of the views:

Fig. 2 is a transverse sectional view thereof on a larger scale taken on line 2—2 of Fig. 1; and Fig. 3 is a longitudinal sectional view taken on line 3—3 of Fig. 1.

Figure 1:
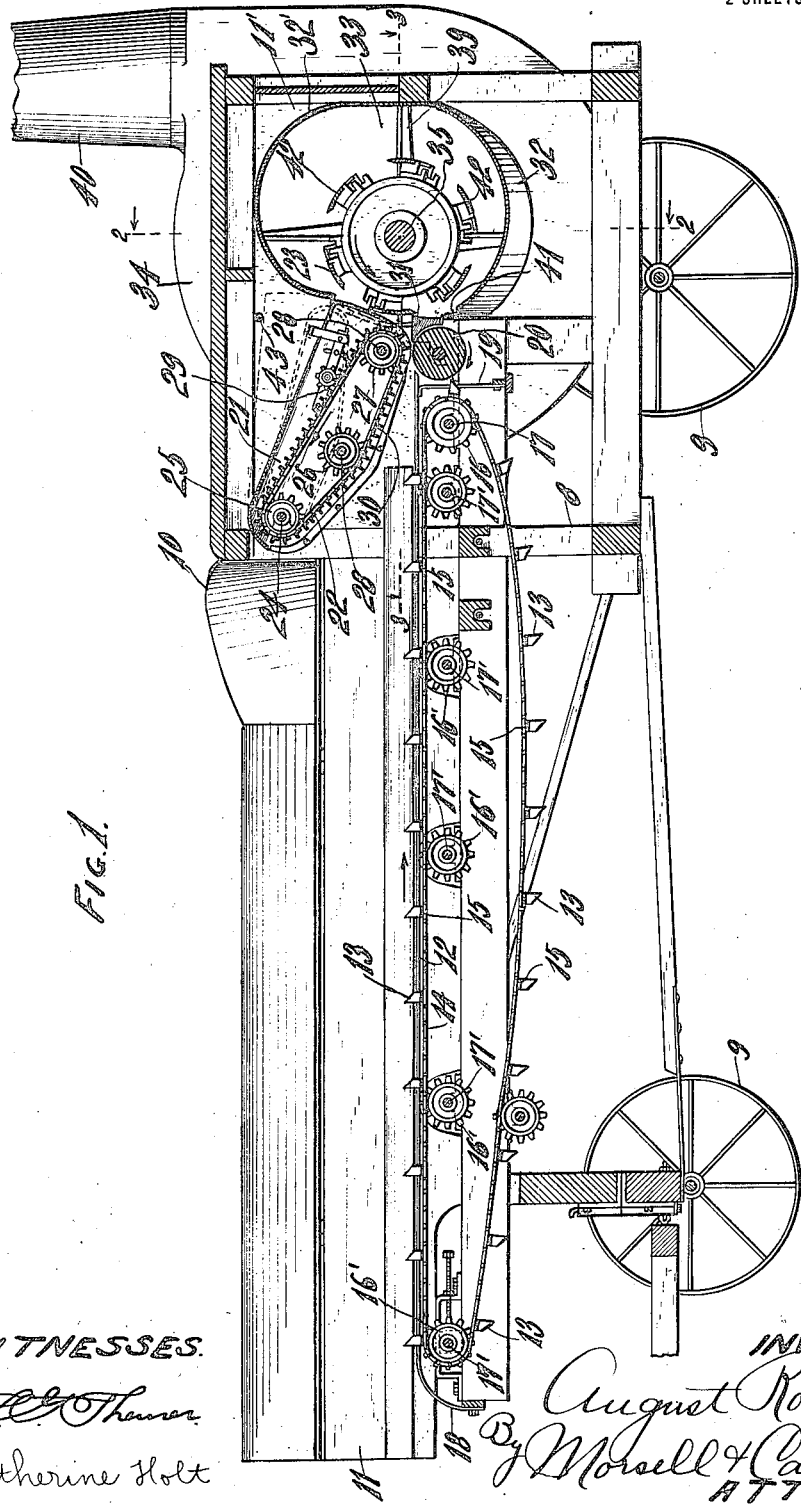
Figure 1 is a medial longitudinal sectional view of the improved ensilage cutter and elevator.

Referring to the drawings the numeral 8 indicates the frame work of the improved ensilage cutter and elevator which is mounted on wheels 9 for convenience of transportation. A casing 10 mounted on the frame is provided with side walls 11 and a slatted bottom portion 12 extending for a portion of its length to form a charging trough into which the material to be cut and elevated is placed. The slats extend longitudinally with relation to the trough and are spaced a distance apart to permit the projecting fingers 13 of the endless feed belt or chains 14 to extend upwardly therethrough. The fingers are mounted on transverse bars 15 carried by the feed chains and the chains are mounted on sprocket wheels 16 and 16', the shafts 17 and 17' of which are mounted on the frame 8. The outer ends 18 of the slats are curved downwardly and secured to the frame 8 and the inner ends of said slats are connected to and supported on the upper ends of upstanding bars 19 mounted on the frame just beyond the inner end of the path of travel of the transverse bars 15.

A transversely extending feed roller 20 is mounted in front of the inner ends of the feed chains and the upper peripheral edge of the roller is in alinement with the upper surface of the slats so the material moved on the slats will freely pass over the roller and be assisted in its movement toward the cutter by the roller.

A swinging frame 21 positioned above the inner end portion of the endless feeding means carries an auxiliary upper endless feed belt 22 which extends downwardly at an incline toward the discharge end of the lower feed belt to form a contracted opening or throat to the ensilage cutter 23. The upper end of the swinging frame is pivoted to the sides of the casing and forms a pivotal connection concentric with the driving shaft 24 of the upper endless belt. The endless belt is mounted on sprocket wheels 25 (only one being shown) carried by said shaft 24 and also on other sprocket wheels 26 and 27 mounted on shafts 28 journaled in the swinging frame. A belt tightener 29 is also mounted on the swinging frame to keep the working portion of the feed belt taut.

The sprocket wheels 26 (only one being shown) are positioned to form an angular part 30 of the working portion of the feed belt 22 between the sprockets 25 and 27. This angular part 30 will swing upwardly, when engaged by the material, to a position approximately parallel with the slatted bottom portion 12 and thus provide a feeding engagement of the angular part 30 throughout its entire length. This positioning of the parts serves to compress the material into a compact stream and positively feed the material to the cutter and also hold the main mass of the material while portions are being severed therefrom.

A cutter bar 31 positioned alongside of the feed roller 20 co-acts with the cutter in cutting the material.

The cutter is positioned within the inclosed portion 11' of the casing and the curved downwardly inclined bottom portion or chute 32 of the casing extends downwardly at an angle from one side of the frame to the opening 33 in the fan casing 34 mounted alongside of the frame. The shaft 35 of the cutter 23 extends through the frame on both sides and also through the fan casing and on its opposite ends is provided with belt wheels 36 and 37, either one of which may have a belted connection with a source of power. The shaft on one end is also provided with a driving connection 38 with the feed roller and the endless belts.

A rotary blower or fan 39 mounted on the cutter shaft 35 and positioned within the fan casing serves to draw the cut material directly from the cutter casing and force it up the elevating tube 40 connected to the fan casing.

It will be particularly noted that the bearings are only provided for the opposite end portions of the combined cutter and fan shaft and that no bearing is positioned between the cutter and the fan. This construction and arrangement of parts is of great importance to the successful operation of the machine as it provides a clear passageway for the cut material in passing from the cutter to the fan casing, thus eliminating obstructions between the two devices which would have a tendency to interfere and clog the passage of material therethrough.

The bottom portion 32 of the cutter casing is spaced a slight distance from the cutter bar 31 to provide an air inlet opening 41 and the end of the casing opposite to the fan is also provided with perforations 41' so that the air drawn therethrough by the suction of the fan will assist in drawing the cut material into the fan casing.

The cut material is further assisted or directed toward the fan casing from the cutter casing by means of the blades 42 of the cutter, which extend spirally around the cutter shaft 35 in a direction to provide a shearing cut and to deflect or impel the cut material toward the fan casing.

A stop 43 in the form of a transverse rod is provided for limiting the upward swing of the swinging frame 21.

It will be noted that the opening to the fan casing is comparatively large and that the trough 32 is provided with a rounded trough guide upper portion 32' which terminates at and coincides in shape with the fan case opening to form in connection with the trough an unobstructed cutter casing to the opening. The said casing flares or increases in diameter toward its discharge end and unobstructedly opens into the fan casing so that as the material is cut and whirled around by the cutter it will move spirally around the trough and the trough guide portion in a direction toward the larger end and pass through the fan case opening into the fan casing.

The material in whirling around the cutter casing will also be accelerated in its movement toward the fan case opening by the inward movement of the air or suction of the fan so that the combined influence of the imparted movement and the flared casing and the fan suction will prevent the material from falling and massing in the bottom portion of the cutter casing and perhaps clogging up the machine.

This acceleration of the moving particles of material also serves to permeate the air blast from the fan with the particles of material so that the said particles cannot mass closely together and clog the fan elevating tube and consequently the particles will be carried up the tube with the minimum amount of friction and be discharged from the tube in a continuous steady stream with the minimum load on the fan.

In operation the material to be cut is dropped on the slatted bottom portion of the trough and the fingers projecting therethrough will engage and move the material beneath the auxiliary endless belt where it will be further engaged and moved by said belt. As the material passes beneath the belt, the belt will be swung upwardly to a position where its angular portion will be approximately parallel with the bottom portion. In this position the material will be compressed between the two feeding means and the feed roller into a compact stream and fed to the cutter. By means of the compact stream the main portion is more easily held while severing the part being cut and as the particles are severed from the main portion they will be impelled and separated with great velocity by the angularity of and the movement of the cutter blades into a whirling mass of spaced particles. While in this state the particles will be subjected to the air suction and will be accelerated in their movement toward the fan casing and if any of the particles should strike portions of the cutter casing, the flaring form thereof will deflect them toward and into the fan casing. In passing into the fan casing it will be forced up the discharge tube of the casing to the point of discharge.

From the foregoing description it will be seen that the ensilage cutter and elevator is of very simple construction and is well adapted for the purpose described.

What I claim as my invention is:

1. An ensilage cutter and elevator, comprising a frame having a casing mounted thereon, a cutter mounted in the casing, a fan and its casing positioned adjacent to the frame casing and having its rotary part mounted on the cutter shaft, said cutter casing having a large unobstructed opening communicating with the fan casing, an inclined chute for discharging material cut by the cutter directly into the fan casing, and means for feeding material to the cutter.

2. In a device of the class described, the combination of a rotary feed-cutting device, a rotary fan-device mounted adjacent to said cutting-device, means for rotating both of said devices, and a combined casing inclosing both; the part of said casing inclosing said cutting-device opening freely and without obstruction into the part containing said fan-device and having a sloping bottom along which material falling on it is adapted to slide into said fan-part and the pieces of material striking which are deflected by it into said fan-part, said sloping bottom portion leading longitudinally from the cutting chamber to the fan chamber.

3. In a device of the character described, the combination of a cutter head mounted upon a shaft, a casing adapted to inclose said cutter head, a fan chamber and a fan located within said chamber and upon the cutter head shaft, said cutter head casing being tapered, the larger portion being located adjacent the fan casing.

4. In a device of the character described the combination of a cutter head mounted upon a shaft, a fan casing, a fan located within the casing and mounted upon the cutter head shaft, a cutter head casing adapted to inclose said cutter head and the air intake end of said casing provided with air passages, said cutter head casing being tapered from the fan casing toward the air intake end thereof.

5. In a device of the character described, the combination of a cutting mechanism consisting of a cutter head and cutter bar, said cutter head mounted upon a shaft, a casing adapted to inclose said cutter head, said casing being of frustum shape, the outer reduced extremity of said casing being provided with a perforated wall, a fan chamber provided with an opening, the opening in said fan chamber communicating with the larger extremity of said frustum shaped casing, a fan located within said fan chamber, said fan mounted upon the cutter head shaft.

In testimony whereof, I affix my signature, in presence of two witnesses.

AUGUST ROSENTHAL.

Witnesses:
C. H. KEENEY,
EMILY SCHOWALTER.